(12) United States Patent
Itoh

(10) Patent No.: US 10,338,668 B2
(45) Date of Patent: Jul. 2, 2019

(54) WEARABLE COMPUTER WITH POWER GENERATION

(71) Applicant: LENOVO (SINGAPORE) PTE. LTD., Singapore (SG)

(72) Inventor: Hiroshi Itoh, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 132 days.

(21) Appl. No.: 15/625,133

(22) Filed: Jun. 16, 2017

(65) Prior Publication Data
US 2018/0024617 A1 Jan. 25, 2018

(30) Foreign Application Priority Data
Jul. 21, 2016 (JP) .................... 2016-143430

(51) Int. Cl.
| | |
|---|---|
| G06F 1/00 | (2006.01) |
| G06F 1/3287 | (2019.01) |
| G06F 1/16 | (2006.01) |
| G06F 1/3296 | (2019.01) |
| H02N 11/00 | (2006.01) |
| G06F 1/28 | (2006.01) |
| G06F 1/3231 | (2019.01) |

(52) U.S. Cl.
CPC ............ *G06F 1/3287* (2013.01); *G06F 1/163* (2013.01); *G06F 1/28* (2013.01); *G06F 1/3231* (2013.01); *G06F 1/3296* (2013.01); *H02N 11/002* (2013.01); *G06F 2200/1637* (2013.01); *Y02D 10/171* (2018.01); *Y02D 10/173* (2018.01)

(58) Field of Classification Search
None
See application file for complete search history.

(56) References Cited

U.S. PATENT DOCUMENTS

| | | | | |
|---|---|---|---|---|
| 2012/0234323 | A1* | 9/2012 | Connor | A61M 16/0066 128/204.21 |
| 2014/0276227 | A1* | 9/2014 | Perez | A61B 5/4818 600/586 |
| 2016/0058133 | A1* | 3/2016 | Fournier | H04B 1/3888 455/41.2 |
| 2016/0132369 | A1* | 5/2016 | Lee | G06F 1/3296 713/2 |
| 2017/0258386 | A1* | 9/2017 | Woltjer | A61B 5/204 |

(Continued)

*Primary Examiner* — Nitin C Patel
(74) *Attorney, Agent, or Firm* — Shimokaji IP

(57) ABSTRACT

A wearable computer includes a body temperature power generation device that generates electric power using a body temperature of a wearer, a vibration power generation device, and a control section. The control section includes a determination unit that determines whether the wearer is sleeping or not, and an operation mode selecting unit that selects an operation mode from a high power consumption mode and a low power consumption mode. The operation mode selecting unit selects the low power consumption mode at least in a period in which the determination unit determines that the wearer is sleeping. The body temperature power generation device generates electric power in at least the period in which the determination unit determines that the wearer is sleeping. The vibration power generation device generates electric power in at least a period in which the determination unit determines that the wearer is not sleeping.

5 Claims, 5 Drawing Sheets

(56) References Cited

U.S. PATENT DOCUMENTS

2017/0303052 A1* 10/2017 Kakareka ................ G06F 1/163
2018/0099116 A1* 4/2018 Ashby .................. A61B 5/6892
2018/0242106 A1* 8/2018 Miyazawa ............. G08B 27/00
2018/0351069 A1* 12/2018 Boukai ................... H01L 35/30

* cited by examiner

WEARABLE COMPUTER WITH POWER GENERATION

FIELD OF THE INVENTION

The present invention relates to a wearable computer.

BACKGROUND OF THE INVENTION

A watch-type wearable computer that is attached to an arm of a user has been known to date. Such a watch-type wearable computer is typically charged by being connected to a power supply through, for example, a charging cord or a dedicated charging station.

SUMMARY OF THE INVENTION

A wearable computer needs to be small in size and lightweight as compared to a portable information processing terminal such as a cellular phone. For this reason, a secondary battery incorporated in the wearable computer tends to have a limited capacity, and a continuous use period is shorter than that of a cellular phone or the like. Thus, it is necessary to relatively frequently charge the wearable computer, which might cause inconvenience for a user.

The present invention has been made in view of the foregoing circumstances, and has an object of providing a wearable computer that can reduce inconvenience for a user in charging.

In an aspect of the present invention, a wearable computer includes: a body temperature power generation device that generates electric power by using a body temperature of a wearer; another power generation device different from the body temperature power generation device; a determination unit that determines whether the wearer is sleeping or not; and an operation mode selecting unit that selects an operation mode from a high power consumption mode and a low power consumption mode, wherein the operation mode selecting unit selects the low power consumption mode in at least a period in which the determination unit determines that the wearer is sleeping, the body temperature power generation device generates electric power in at least the period in which the determination unit determines that the wearer is sleeping, and the another power generation device generates electric power in at least a period in which the determination unit determines that the wearer is not sleeping.

In another aspect of the present invention, a wearable computer includes: a body temperature power generation device that generates electric power by using a body temperature of a wearer; a determination unit that determines whether the wearer is sleeping or not; and an operation mode selecting unit that selects a low power consumption mode as a current operation mode in a case where the determination unit determines that the wearer is sleeping, wherein the body temperature power generation device generates electric power at least in a period in which the determination unit determines that the wearer is sleeping.

DETAILED DESCRIPTION OF THE INVENTION

A wearable computer according to an embodiment of the present invention will be described with reference to the drawings. A wearable computer 10 is a portable computer system that can be used while being worn by a human body. Examples of the wearable computer include a watch-type wearable computer that is attached on an arm of a wearer and a head mount-type wearable computer that is attached to the head of a wearer.

Figure 1:
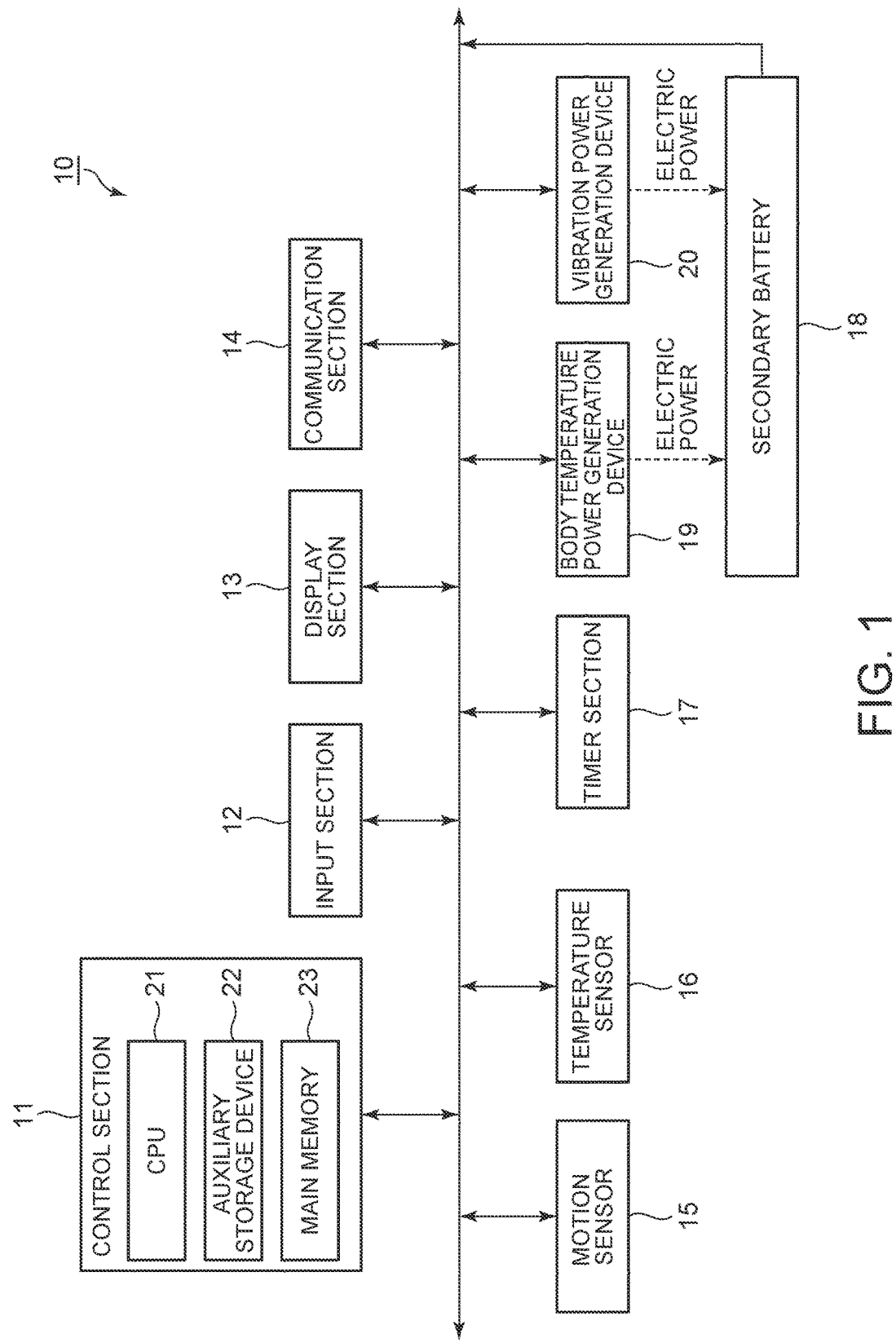
FIG. 1 is a view illustrating an example of a hardware configuration of a wearable computer according to an embodiment of the present invention.

FIG. 1 is a view illustrating an example of a hardware configuration of the wearable computer 10 according to the embodiment of the present invention. As illustrated in FIG. 1, the wearable computer 10 includes, for example, a control section 11, an input section 12, a display section 13, a communication section 14, a motion sensor 15, a temperature sensor 16, a timer section 17, a secondary battery 18, a body temperature power generation device 19, and a vibration power generation device 20. These components are electrically connected to one another through a bus 30.

The control section 11 includes, for example, a central processing unit (CPU) 21, an auxiliary storage device 22 for storing data such as a program to be executed by the CPU 21, and a main memory 23.

The auxiliary storage device 22 is a computer-readable storage medium, and is typically a magnetic disk, a magneto-optical disk, a CD-ROM, a DVD-ROM, or a semiconductor memory, for example. In the wearable computer 10, a semiconductor memory is suitable in view of the chassis size.

The main memory 23 is constituted by a writable memory such as a cache memory or a random access memory (RAM), and is used as a work area where the execution program of the CPU 21 is read out and processing data based on the execution program is written, for example.

The input section 12 is a user interface that enables a user to perform an input operation, and is implemented as a touch panel integrated with a display section 13 described later, for example.

The display section 13 is, for example, a liquid crystal display device, and provides display in accordance with control of the control section 11.

The motion sensor 15 includes, for example, at least one of a three-axis acceleration sensor, a gyro sensor, or a magnetic field sensor, and detects motion of a wearer by detecting, for example, a tilt and a motion of the wearable computer 10 in three-axis directions with respect to a reference posture thereof.

The temperature sensor 16 detects, for example, the body temperature of the wearer.

Sensor signals detected by the motion sensor 15 and the temperature sensor 16 are output to the control section 11 and are used for various processes.

The body temperature power generation device 19 is a device that generates electric power by using the body temperature of the wearer, and includes, for example, a Peltier device that generates electric power by using a temperature difference between the body temperature of the wearer and an outdoor temperature. Electric power generated by the body temperature power generation device 19 is stored in the secondary battery 18. The body temperature power generation device 19 generates electric power in at least a period in which a determination unit 31 (see FIG. 2) described later determines that the wearer is sleeping. The body temperature power generation device 19 preferably also generates electric power in a period except the period in which the wearer is determined to be sleeping, and more preferably constantly generates electric power as long as the device 19 can generate electric power by using the body temperature of the wearer.

The vibration power generation device 20 is a device that generates electric power by using vibrations and, for example, generates electric power by using vibrations caused by a motion of the wearer. The vibration power generation device 20 generates electric power at least in a period in which the determination unit 31 (see FIG. 2) described later determines that the wearer is not sleeping as long as the device 20 can generate electric power by using vibrations. Electric power generated by the vibration power generation device 20 is stored in the secondary battery.

Figure 2:
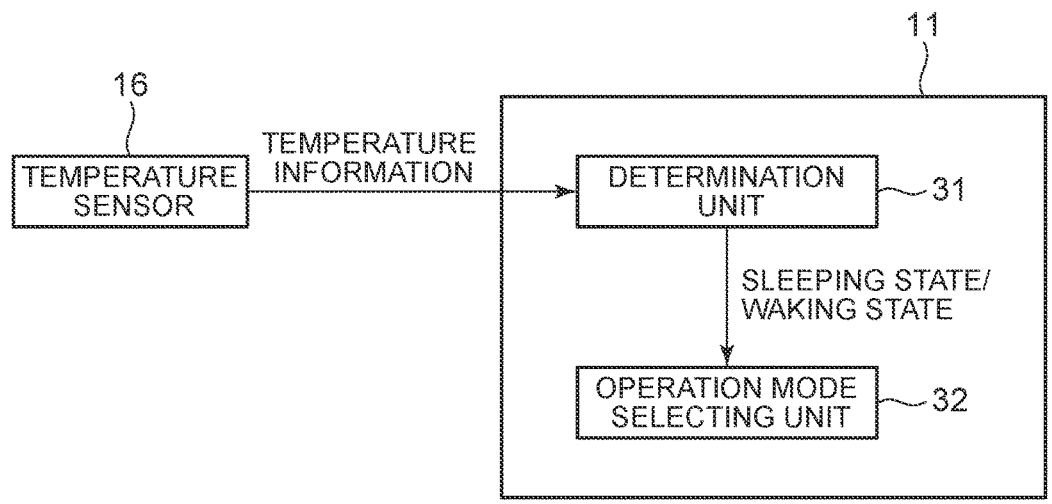
FIG. 2 is a functional block diagram showing functions of a control section according to the embodiment of the present invention in a developed manner.

FIG. 2 is a functional block diagram showing functions of the control section 11 in a developed manner. As illustrated in FIG. 2, the control section 11 includes the determination unit 31 and an operation mode selecting unit 32. In the auxiliary storage device 22 (see FIG. 1) of the control section 11, a series of processing procedures for implementing the functions of these components is written as a program. The CPU 21 reads various programs from the auxiliary storage device 22 to the main memory 23, and executes the programs so that functions of the components described later are implemented.

The determination unit 31 determines whether the wearer is sleeping or not. Specifically, the determination unit 31 determines whether the wearer is sleeping or not based on a change of the body temperature of the wearer detected by the temperature sensor 16.

Figure 3:
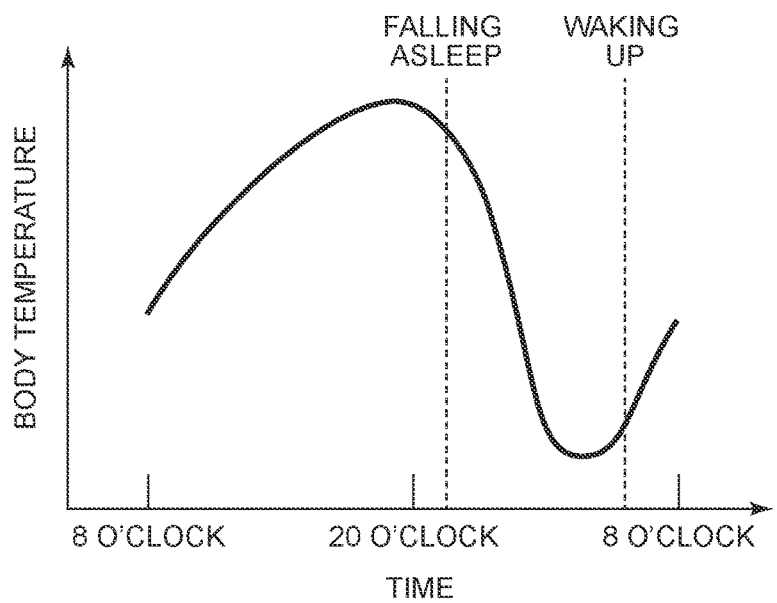
FIG. 3 is a graph showing a typical example of a change of a body temperature in a day.

FIG. 3 is a graph showing a typical example of a change of the body temperature in a day. As shown in FIG. 3, the body temperature slowly rises from morning to night, steeply drops from the falling-asleep time at night to slightly before the waking-up time in the morning, and then slowly rises again. As shown in FIG. 3, characteristics of change of the body temperature are clearly different between a sleeping period and a waking period. Thus, by detecting the body temperature of the wearer, it is possible to determine whether the wearer is awake or asleep based on characteristics of the change with time of the detected body temperature.

The determination unit 31 calculates a change rate of the temperature in a predetermined period from the temperature detected by the temperature sensor 16, for example. If the absolute value of the change rate of the calculated temperature is a predetermined determination threshold or more and the temperature shows a tendency of decrease, the determination unit 31 determines that the wearer is sleeping. Since the body temperature varies among individuals, the body temperature of the wearer may be tentatively recorded together with time information in several days so that the determination threshold is customized from the history of the recorded body temperatures.

Instead of the determination condition described above, the determination unit 31 may determine that the wearer is sleeping if the temperature detected by the temperature sensor 16 shows a tendency of a predetermined number of consecutive decreases. The determination condition for determining whether the wearer is sleeping or not is not limited to the examples described above, and may be appropriately set based on characteristics as shown in FIG. 3.

If the determination unit 31 determines that the wearer is sleeping, the operation mode selecting unit 32 selects a low power consumption mode as a current operation mode. Specifically, the operation mode selecting unit 32 selects the low power consumption mode among a plurality of operation modes including a high power consumption mode and the low power consumption mode, at least in a period in which the determination unit 31 determines that the wearer is sleeping.

The low power consumption mode is a mode in which operations of at least the display section 13 and the communication section 14 are stopped. The low power consumption mode is, for example, one of a suspended mode, a hibernation mode, or a sleep mode. The sleep mode is, for example, a mode in which only functions necessary for determining whether the wearer is sleeping or not are kept in an operating state and the other functions are set in an operation suspended mode. In the sleep mode, for example, the temperature sensor 16 and the control section 11 are allowed to operate and operations of the other components are stopped.

The high power consumption mode is a mode in which power consumption is larger than that of the low power consumption mode and at least one of the display section 13 or the communication section 14 is in the operating state.

If the determination unit 31 determines that the wearer is sleeping, the operation mode selecting unit 32 switches the operation mode to the low power consumption mode if the current operation mode is not the previously set low power consumption mode (e.g., normal operation mode), whereas if the current operation mode is the low power consumption mode, the operation mode selecting unit 32 maintains the current mode.

Next, an operation concerning charging of the wearable computer 10 according to this embodiment will be described with reference to FIGS. 1 and 2.

For example, the body temperature power generation device 19 and the vibration power generation device 20 are always in the operating state, and generate electric power in a situation where electric power can be generated. The generated electric power is stored in the secondary battery 18.

The temperature sensor 16 regularly detects the body temperature of the wearer, and outputs the detected temperature to the control section 11. The determination unit 31 of the control section 11 calculates the temperature change rate of the wearer by using the temperature received from the temperature sensor 16 and at least one temperature received in the past, for example. If the absolute value of the calculated temperature change rate is the predetermined determination threshold or more and the temperature shows a tendency of decrease, the determination unit 31 determines that the wearer is sleeping.

If the determination unit 31 determines that the wearer is sleeping, the operation mode selecting unit 32 selects the low power consumption mode as the current operation mode. In this manner, the wearable computer 10 is set in the low power consumption mode in the period in which the determination unit 31 determines that the wearer is sleeping.

When the wearer performs an operation of indicating cancellation of the low power consumption mode with the input section 12 (e.g., presses a power button), for example, this operation means wake-up of the wearer, and thus, the operation mode selecting unit 32 cancels the low power consumption mode and switches the current operation mode to a mode in accordance with the input operation, such as a normal mode (high power consumption mode).

The timing of canceling the low power consumption mode is not limited to the example described above. For example, since the wearer performs some activity after wake-up, the motion sensor 15 detects a motion. Thus, the low power consumption mode may be canceled in a case where the motion sensor 15 continuously detects motion. In this case, as the condition for cancellation, the motion sensor 15 is also in operation in the low power consumption mode.

Figure 4:
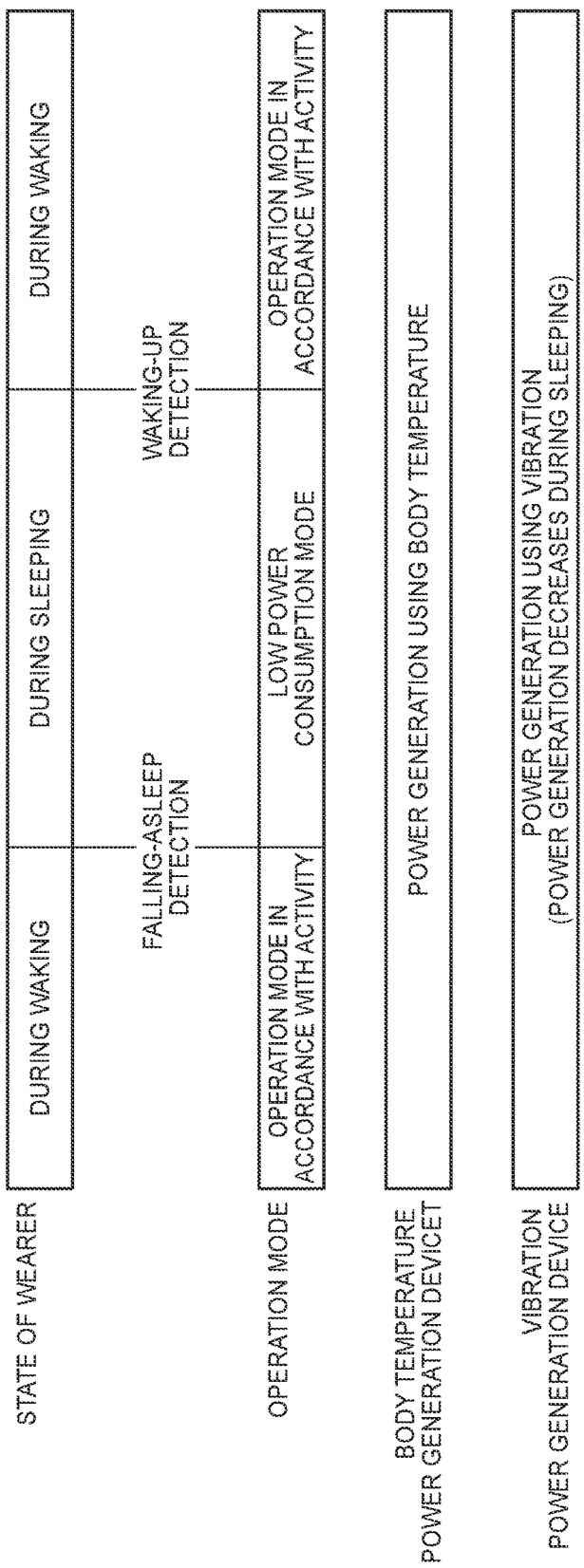
FIG. 4 is a view showing an operation mode of the wearable computer according to the embodiment of the present invention, power generation states, and the state of a wearer, in association with one another.

As described above, as illustrated in FIG. 4, in the wearable computer 10 according to this embodiment, the operation mode is set at the low power consumption mode while the wearer is sleeping. Thus, power consumption during sleeping can be reduced, and most of the electric power generated by the body temperature power generation device 19 is not consumed by a load and is stored in the secondary battery 18. In this manner, when the wearer wakes up, the secondary battery 18 can be almost fully charged. Thus, the secondary battery 18 can be charged without any special preparation for charging so that inconvenience for a user in charging can be reduced.

The wearable computer 10 according to this embodiment includes the body temperature power generation device 19 and the vibration power generation device 20 as another power generation device different from the body temperature power generation device 19, and power consumption is reduced and electric power is generated by using the body temperature during sleeping in which the amount of power generation by the vibration power generation device 20 as another power generation device decreases. Consequently, a decrease in the amount of power generation by the vibration power generation device 20 can be compensated for.

In addition, in the wearable computer 10 according to this embodiment, the determination unit 31 determines whether the wearer is sleeping or not by using a value measured by the temperature sensor 16. The temperature sensor 16 is also used for controlling the body temperature power generation device 19. Thus, since the determination unit 31 performs the determination process by using measured information by the temperature sensor 16 attached to the body temperature power generation device 19, an additional sensor dedicated to determination on whether the wearer is sleeping or not is unnecessary so that increases in device size and cost can be avoided.

In the above embodiment, the vibration power generation device 20 is provided as another power generation device different from the body temperature power generation device. Alternatively, instead of the vibration power generation device 20, another power generation device may be provided. A power generation device different from the body temperature power generation device 19 is not necessarily provided, and a configuration including no power generation device except the body temperature power generation device may be employed.

In the wearable computer 10 according to this embodiment, the determination unit 31 determines whether or not the wearer falls asleep or wakes up by using the body temperature of the wearer. The present invention, however, is not limited to this example, and whether the wearer is sleeping or not may be determined by using other determination criteria.

Figure 5:
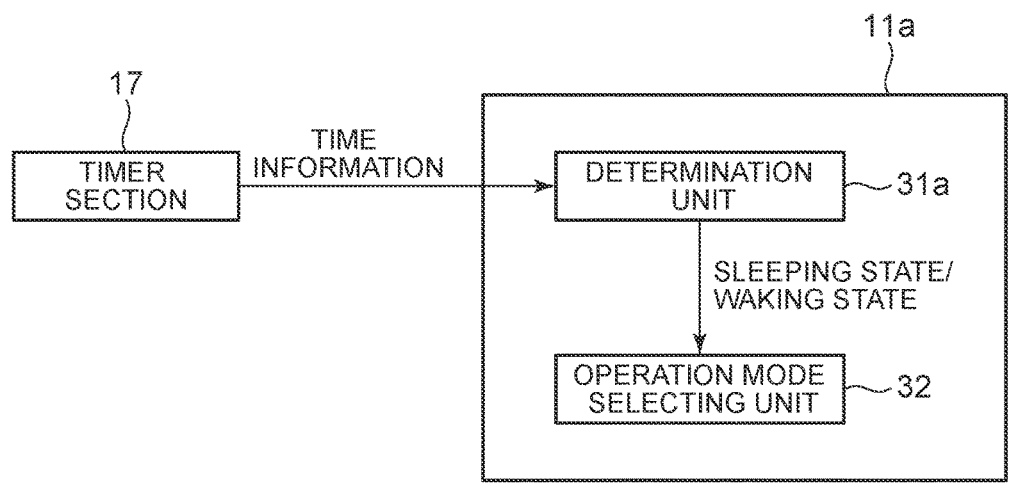
FIG. 5 is a view illustrating another aspect of a determination unit.

For example, as illustrated in FIG. 5, a determination unit 31a may determine whether the wearer is sleeping or not based on time information received from the timer section 17. In this case, for example, the falling-asleep time and the waking-up time are previously set, and the determination unit 31a determines that the wearer is sleeping if the time received from the timer section 17 falls within a period from the falling-asleep time to waking-up time. Here, the falling-asleep time and waking-up time may be appropriately adjusted in accordance with living patterns of the wearer. For example, since falling-asleep and wake-up can be estimated based on the body temperature as described above, times and body temperatures may be recorded so that the falling-asleep time and the waking-up time are adjusted based on the history of the times and the body temperatures. A configuration that enables the wearer to set the falling-asleep time and the waking-up time may be employed. Alternatively, in a case where an alarm function of a watch is set, the time set as the alarm time may be used as the waking-up time.

Figure 6:
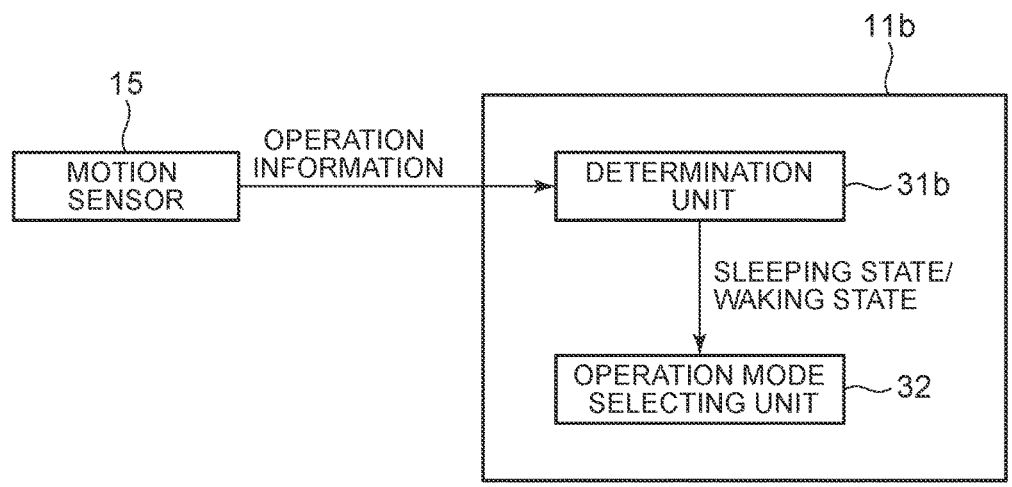
FIG. 6 is a view illustrating yet another aspect of the determination unit.

Alternatively, as illustrated in FIG. 6, for example, a determination unit 31b may determine whether the wearer is sleeping or not by using motion information detected by the motion sensor 15. For example, the wearer may be determined to be sleeping if a motion corresponding to tossing is detected from the detection result of the motion sensor 15.

Figure 7:
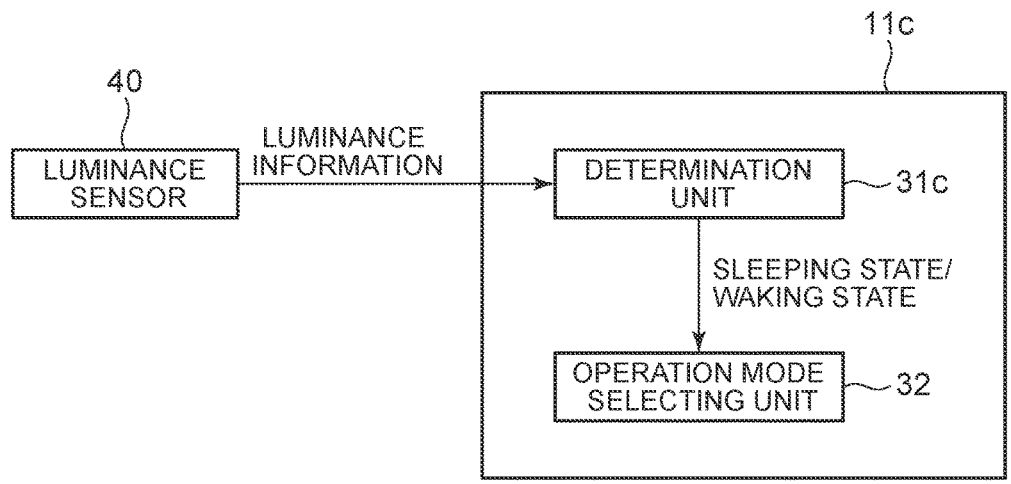
FIG. 7 is a view illustrating still another aspect of the determination unit.

Alternatively, as illustrated in FIG. 7, for example, the wearable computer 10 may further include a luminance sensor 40 so that a determination unit 31c determines whether the wearer is sleeping or not based on luminance information detected by the luminance sensor 40. For example, if a state in which the luminance received from the luminance sensor 40 is a predetermined luminance or less continues for a predetermined period, the determination unit 31c may determine that the wearer is sleeping.

Figure 8:
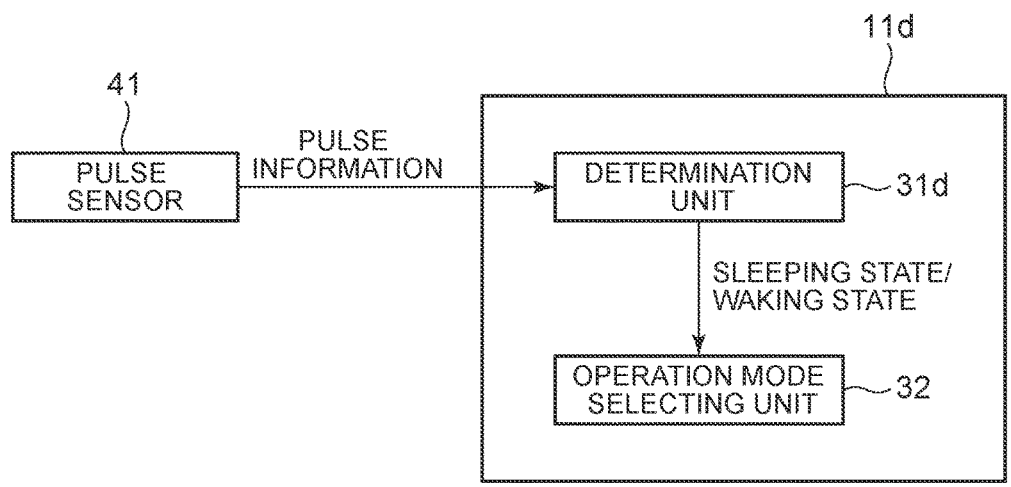
FIG. 8 is a view illustrating another aspect of the determination unit.

During sleeping, the pulse rate (heart rate) decreases. Thus, as illustrated in FIG. 8, a pulse sensor 41 that detects the pulse rate of the wearer may be further provided so that a determination unit 31d determines whether the wearer is sleeping or not based on pulses detected by the pulse sensor 41.

For example, the pulse sensor 41 applies light to blood vessels in the skin of the wearer, receives reflected light not absorbed in hemoglobin in the blood, and derives the pulse rate per a unit time based on the quantity of the reflected light. If the pulse rate measured by the pulse sensor 41 is a predetermined threshold or less, the determination unit 31d determines that the wearer is sleeping. In the same manner as the body temperature, the pulse rate varies among individuals. Thus, the threshold may be adjusted by using, for example, a history of past pulse rates of the wearer.

The determination on whether the wearer is sleeping or not may be performed by appropriately combining the determination conditions of the determination units 31, 31a to 31d. The input section 12 may further include an operation unit for enabling the wearer to indicate falling asleep and waking up so that the determination unit performs determination on falling asleep or waking up based on a wearer's operation of the operation unit.

The present invention has been described with reference to the embodiment. The technical scope of the invention is not limited to the range described in the above embodiment. Various changes and modifications may be made on the embodiment within the range of the invention, and embodiments obtained by such changes and modifications are also included in the technical scope of the invention.

I claim:

1. A wearable computer comprising:
   a body temperature power generation device configured to generate electric power by using a body temperature of a wearer;
   a vibration power generation device configured to generate electric power by using motion of the wearer;
   wherein the body temperature power generation device and the vibration power generation device are always in an operating state;
   a secondary battery that stores electric power from the body temperature power generation device and from the vibration power generation device;
   a motion sensor that detects motion of the wearable computer;
   a temperature sensor that detects a body temperature of the wearer;
   a timer section that stores a falling-asleep time and a waking-up time;
   a determination unit that determines whether the wearer is sleeping or not sleeping based on:
      a change of rate of the body temperature in a predetermined period;
      a time received from the timer section is within or outside a period from the falling-asleep time to the waking-up time; and
   wherein, when the body temperature rate of change equals or exceeds a threshold, and the body temperature has a tendency of decrease in the predetermined period, the determination unit determines that the wearer is sleeping;
   an operation mode selecting unit that selects an operation mode from a high power consumption mode and a low power consumption mode,
   wherein the operation mode selecting unit selects the low power consumption mode when the determination unit determines that the wearer is sleeping,
   wherein the body temperature power generation device generates electric power in at least the period in which the determination unit determines that the wearer is sleeping, and
   wherein the vibration power generation device generates electric power in at least a period in which the determination unit determines that the wearer is not sleeping.

2. The wearable computer according to claim 1, wherein the body temperature power generation device also generates electric power in a period in which the determination unit determines that the wearer is not sleeping.

3. The wearable computer according to claim 1, wherein the low power consumption mode is one of a suspended mode, a hibernation mode, or a sleep mode in which operation is stopped except functions concerning determination by the determination unit.

4. The wearable computer according to claim 1, wherein the second power generation device is a vibration power generation device configured to generate electric power by using a vibration.

5. A wearable computer comprising:
   a body temperature power generation device configured to generate electric power by using a body temperature of a wearer;
   a vibration power generation device configured to generate electric power by using motion of the wearer;
   wherein the body temperature power generation device and the vibration power generation device are always in an operating state;
   a motion sensor that detects motion of the wearable computer;
   a temperature sensor that detects a body temperature of the wearer;
   a determination unit that determines whether the wearer is sleeping or not sleeping based on a change of rate of the body temperature in a predetermined period;
   wherein, when the body temperature rate of change equals or exceeds a threshold, and the body temperature has a tendency of decrease in the predetermined period, the determination unit determines that the wearer is sleeping; and
   an operation mode selecting unit that selects a low power consumption mode as a current operation mode when the determination unit determines that the wearer is sleeping,
   wherein the body temperature power generation device generates electric power at least in a period in which the determination unit determines that the wearer is sleeping.

* * * * *